(12) United States Patent
Yoshikawa et al.

(10) Patent No.: US 7,697,202 B2
(45) Date of Patent: Apr. 13, 2010

(54) SCREEN, FRESNEL LENS SHEET USED FOR THE SAME, AND IMAGE DISPLAY APPARATUS USING THE SAME

(75) Inventors: Hiroki Yoshikawa, Hiratsuka (JP); Tetsu Ohishi, Hiratsuka (JP); Koji Hirata, Yokohama (JP); Daisuke Imafuku, Fujisawa (JP)

(73) Assignee: Hitachi, Ltd. (JP)

( * ) Notice: Subject to any disclaimer, the term of this patent is extended or adjusted under 35 U.S.C. 154(b) by 0 days.

(21) Appl. No.: 12/103,241

(22) Filed: Apr. 15, 2008

(65) Prior Publication Data

US 2008/0204868 A1 Aug. 28, 2008

Related U.S. Application Data

(62) Division of application No. 11/012,157, filed on Dec. 16, 2004, now Pat. No. 7,362,503.

(30) Foreign Application Priority Data

Feb. 9, 2004 (JP) ............................. 2004-031502
Jun. 25, 2004 (JP) ............................. 2004-187229

(51) Int. Cl.
*G03B 21/60* (2006.01)
*G03B 21/56* (2006.01)
*G02B 5/04* (2006.01)

(52) U.S. Cl. ...................... 359/457; 359/460; 359/459; 359/454; 359/834; 359/837

(58) Field of Classification Search ................ 359/457, 359/456, 460, 443, 459, 454, 831, 833–834, 359/837
See application file for complete search history.

(56) References Cited

U.S. PATENT DOCUMENTS

| 1,942,841 | A | | 1/1934 | Takeo |
| 4,674,836 | A | * | 6/1987 | Yata et al. .................... 359/457 |
| 6,292,295 | B1 | | 9/2001 | Yamashita et al. |
| 6,726,859 | B2 | * | 4/2004 | Suzuki et al. ................. 264/2.5 |
| 6,804,055 | B2 | | 10/2004 | Peterson et al. |
| 7,362,503 | B2 | * | 4/2008 | Yoshikawa et al. ........... 359/457 |
| 2004/0047037 | A1 | * | 3/2004 | Peterson et al. ............. 359/457 |
| 2005/0030620 | A1 | | 2/2005 | Goto |
| 2005/0099687 | A1 | * | 5/2005 | Watanabe .................... 359/455 |

FOREIGN PATENT DOCUMENTS

WO WO02/27399 4/2002

* cited by examiner

*Primary Examiner*—Georgia Y Epps
*Assistant Examiner*—Magda Cruz
(74) *Attorney, Agent, or Firm*—Antonelli, Terry, Stout & Kraus, LLP.

(57) ABSTRACT

An image display apparatus includes an image generation source, optics for projecting in an enlarged form the image generated by the image generation source, and a transmissive screen for displaying the image projected from said optics. The transmissive screen includes a Fresnel lens sheet disposed at an image generation source side, and a diffusing sheet disposed at an image-watching side in order to diffuse image light at least in a horizontal direction of the screen. The Fresnel lens sheet has a plurality of entrance-side prisms formed at the image generation source side, and a plurality of exit-side prisms formed at the image-watching side, and the Fresnel lens sheet emits lights in a first direction and a second direction. The first direction is almost parallel to a central axis of the Fresnel lens sheet, and the second direction extends toward the central axis.

4 Claims, 11 Drawing Sheets

SCREEN, FRESNEL LENS SHEET USED FOR THE SAME, AND IMAGE DISPLAY APPARATUS USING THE SAME

CROSS REFERENCE TO RELATED APPLICATION

This application is a divisional application of U.S. application Ser. No. 11/012,157, filed Dec. 16, 2004, now U.S. Pat. No. 7,362,503, the contents of which are incorporated herein by reference.

CLAIM OF PRIORITY

The present application claims priority from Japanese applications serial no. JP2004-031502, filed on Feb. 9, 2004 and serial no. JP2004-187229, filed on Jun. 25, 2004, the contents of which are hereby incorporated by reference into this application.

BACKGROUND OF THE INVENTION (1) Field of the Invention

The present invention relates to an image display apparatus for enlarging the images generated by an image generation source, and displaying the images in a projection format on a transmissive screen. The invention also relates to the screen and Fresnel lens sheet used for the image display apparatus.

(2) Description of the Related Art

A projection type of image display apparatus (hereinafter, this type of apparatus may be called the set) enlarges the images displayed by the projection cathode-ray tube or liquid-crystal display apparatus (or the like) that functions as a compact image generation source, projects the enlarged images onto a transmissive screen via a projection lens and/or the like, and thus forms the images on the transmissive screen.

Such a type of set is required to be thinned down (longitudinally downsized) to reduce weight, costs, and an installation space requirement. Known configurations of transmissive screens for use with a thinned-down set include the configuration described in, for example, WO/02/27399 (hereinafter, referred to as Patent Document 1).

SUMMARY OF THE INVENTION

The thinning-down (longitudinal downsizing) of the set can be achieved by reducing the projection distance by use of a wider-angle projection lens and further decentering the optical axis of the projection lens downward with respect to the center of the transmissive screen (e.g., aligning the optical-axis center of the projection lens with the central lower end of the transmissive screen).

Figure 13:
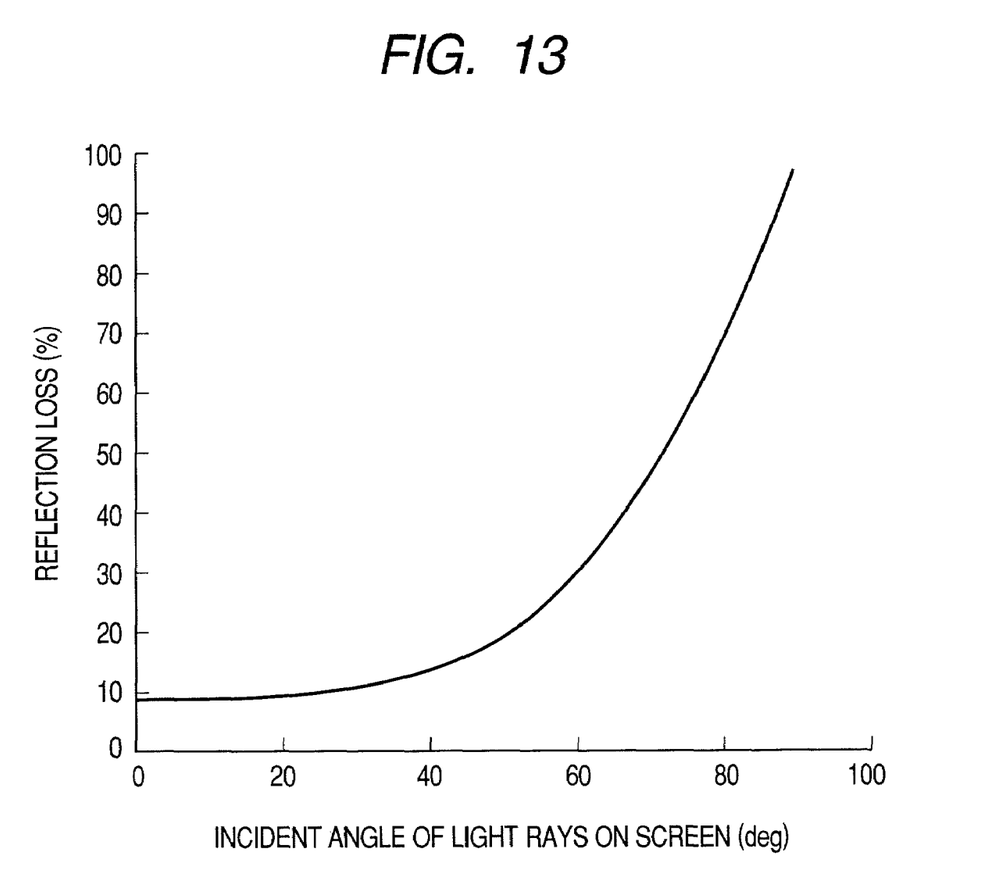
FIG. 13 is a diagram representing the relationship between the incident angle of light rays on the screen of a general exit-face Fresnel lens, and reflection loss.

In such a configuration, however, for example, if the size of the screen (16:9 in terms of aspect ratio), the projection distance of the projection lens, and the depth of the set are set to 65 inches diagonal, 500 mm, and 350 mm, respectively, the incident angle of the image light entering the upper left and right ends of the transmissive screen from the projection lens increases to 65.2 degrees. FIG. 13 is a diagram representing the relationship between the incident angle of light rays on the screen in a general exit-surface Fresnel lens, and reflection loss. It can be seen from FIG. 13 that for a light-ray incident angle of 65.2 degrees, the reflection loss of the screen increases to as much as 36%. Further thinning-down of the set abruptly increases the loss and the upper left and right ends of the screen decrease in brightness.

Patent Document 1 discloses a transmissive screen that responds to such thinning-down of the set by providing refractive prisms and totally reflective prisms alternately on the light entrance surface of a Fresnel lens sheet, and making the exit surface of light into a plane. In the configuration described in Patent Document 1, however, since the configuration has refractive prisms on the light entrance surface of the Fresnel lens sheet, efficiency decreases and particularly a medium-band image (on the screen, a donut-like range) important for obtaining high image quality becomes dark.

Also, in the configuration with refractive prisms and totally reflective prisms on the Fresnel lens sheet, the discontinuity of light may occur at the interface between the refractive prism section and the totally reflective prism section. If the discontinuity of light actually occurs, the image when viewed from the front will include discontinuous portions and deteriorate in image quality.

Accordingly, for a transmissive screen responding to the thinning-down of the set, it is important to reduce the reflection loss of light on the entrance plane of the screen and to improve utilization efficiency of the light and make the image brighter (i.e., to suppress decreases in the brightness of the image). It is also important to suppress the discontinuity of the light.

The present invention has been made in consideration of the above situation, and the invention provides a technology suitable for reducing the depth (longitudinal dimension) of an image display apparatus while at the same time obtaining high-quality images.

In the present invention, a totally reflective prism is formed in the region where light enters at an angle equal to or greater than a desired incident angle (e.g., approximately 40 degrees), at the image generation source side (on the entrance face of light) of a Fresnel lens sheet, and a refractive prism is formed at the image-watching side (on the exit face of the light). The foregoing totally reflective prism includes an entrance face at which the light comes in, and a totally reflective face on which the incoming light from the entrance face is reflected and from which the light exits toward the image-watching side. Also, the foregoing refractive prism is formed, at the image-watching side of the Fresnel lens sheet, in the range including a region present on a face opposite to that of a region in which the totally reflective prism is not formed. The refractive prism also includes a refractive face on which the foregoing light is refracted and from which the light exits toward the image-watching side. This refractive face is roughed to prevent multiple reflection from occurring between the refractive face and the plane of entrance that is disposed on a face opposite to that of the refractive face. The foregoing totally reflective face improves in reflection efficiency by being processed into a mirror surface state.

Alternately, in the present invention, the above totally reflective face may be constructed of at least two faces or more (or as a spherical or nonspherical face) to totally reflect the light coming in from the entrance face and make the light go out as exit rays of exit angles in at least two directions or more. Similarly, the above refractive face may be constructed of at least two faces or more (or as a spherical or nonspherical face) to make light go out as exit rays of exit angles in at least two directions or more. Thus, the amount of occurrence of a flare of the exit light obtained, and a direction in which the flare occurs, can be matched between the mirror-surface-processed totally reflective face and the roughed refractive face.

As described above, when a totally reflective prism and a refractive prism are to be formed at the image generation source side and image-watching side, respectively, of the Fresnel lens sheet, a prism configuration for making light go out in two directions or more may be adopted only for either the totally reflective prism or the refractive prism, or may be adopted for both thereof. If the above prism configuration is adopted for both, since the amount of occurrence of a flare and the direction of its occurrence can be made the same between both prisms, a change in brightness according to a particular watching angle can be suppressed very significantly.

In addition, in the present invention, on a transparent base material constituting the Fresnel lens sheet, the totally reflective prism and the refractive prism may be formed using ultraviolet-cured-type resin. In that case, a first ultraviolet-cured-type resin layer that forms the totally reflective prism may be set to have a transmittance lower than that of a second ultraviolet-cured-type resin layer which forms the refractive prism.

Furthermore, a diffusing material may be contained in the ultraviolet-cured-type resin used to form the refractive prism, and/or in the ultraviolet-cured-type resin used to form the totally reflective prism. Hence, according to the present invention, it becomes possible to thin down an image display apparatus while at the same time obtaining high image quality.

DETAILED DESCRIPTION OF THE PREFERRED EMBODIMENTS

Figure 1:
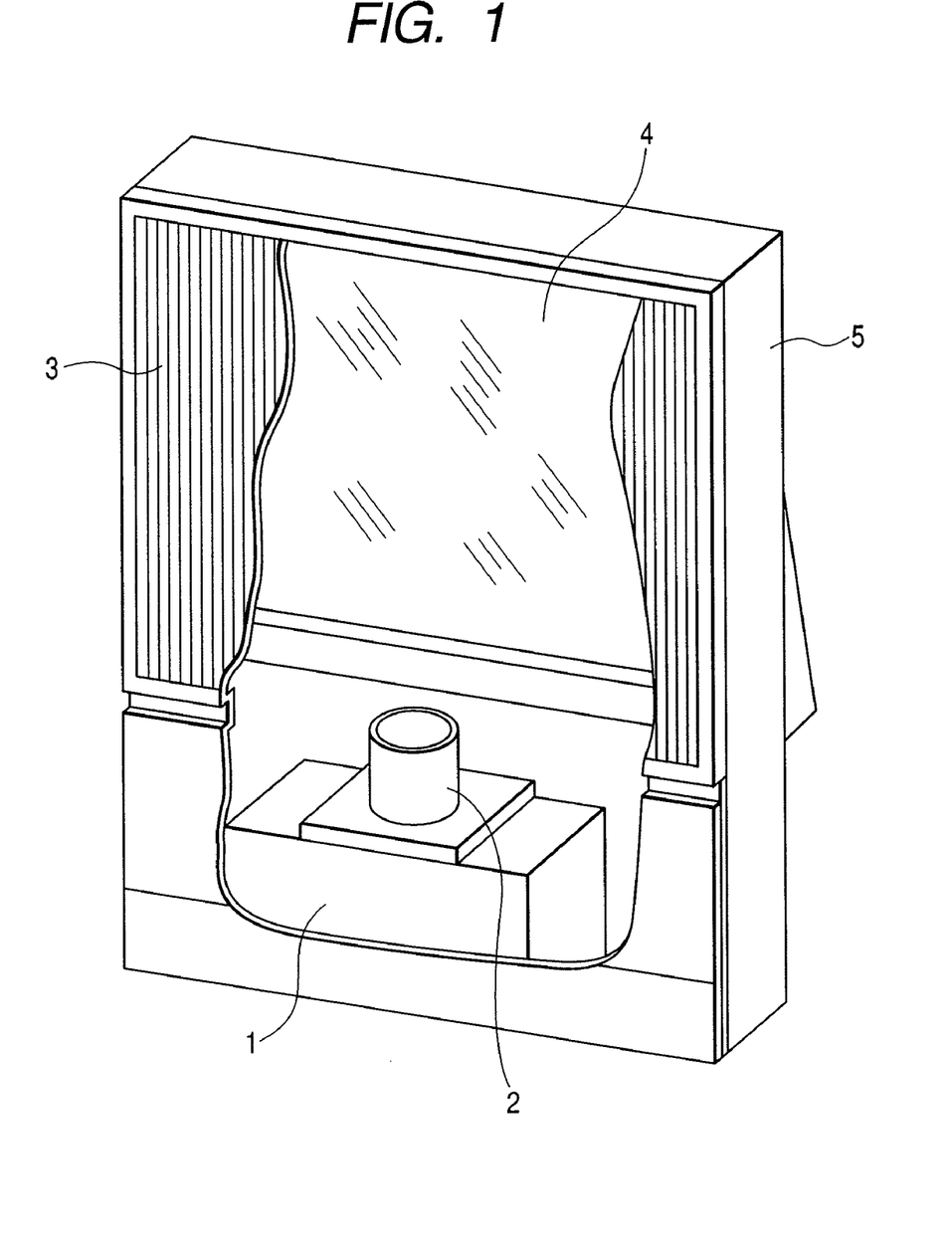
FIG. 1 is a partially sectional, perspective view showing an example of an image display apparatus to which the present invention is applied.

Embodiments of the present invention are described below referring to the accompanying drawings. FIG. 1 is a partially sectional, perspective view showing an example of an image display apparatus according to the present invention. An image generation source 1 includes a projection cathode-ray tube or a reflective or transmissive liquid-crystal panel, an image modulation element such as a display element having a plurality of very small mirrors, and other elements, and displays a compact image. Although a projection lens 2 projects the image onto a transmissive screen 3, since the projection lens is generally long in projection distance, a reflecting mirror 4 is provided halfway on an optical path of the projection lens in order to reduce a depth (longitudinal dimension) of the image display apparatus. These elements are fixed to a desired position inside a frame 5.

Figure 2:
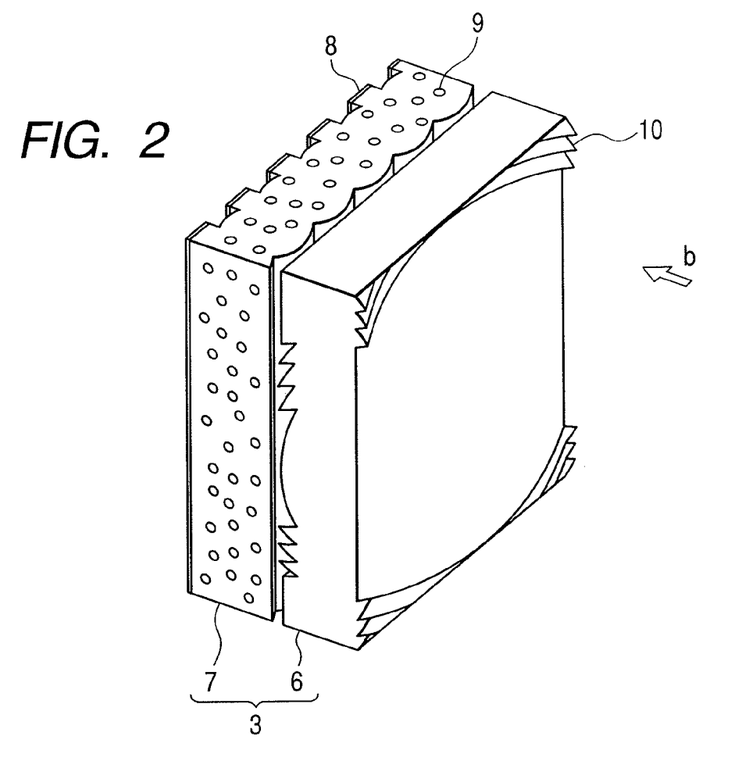
FIG. 2 is a schematic view showing the structure of a transmissive screen 3.

FIG. 2 is a schematic view showing a structure of a transmissive screen 3 according to the present invention. The enlarged image (not shown) projected from a direction of an arrow "b" is converted, at a Fresnel lens sheet 6, into approximately parallel light or the light directed slightly inward, and the image light enters a lenticular lens sheet 7. As shown, the lenticular lens sheet 7 is constructed of a plurality of lenticular lenses arrayed in a horizontal direction of the screen with its vertical direction taken as a longitudinal direction of the lenticular lenses, and diffuses the image light in the horizontal direction of the screen. Also, black stripes 8 extending in the vertical direction of the screen are formed on an exit face of the lenticular lens sheet 7, whereby the external light entering from the exit side of the screen is absorbed. In addition, the lenticular lens sheet 7 contains a diffusing material 9, which functions to diffuse the image light in the horizontal and vertical directions of the screen. In an embodiment of the transmissive screen of FIG. 2 according to the present invention, a totally reflective prism section 10 is provided at the image generation source side of the Fresnel lens sheet, in the range where an incident angle of light of the enlarged image projected from the direction of the arrow "b", on the Fresnel lens sheet becomes at least a desired angle or greater (in the present embodiment, approximately 40 degrees or more). The totally reflective prism section 10 is constructed of at least two faces or more (or as a spherical or nonspherical face) so as to give, by generating a total-reflection phenomenon following completion of a first refraction phenomenon, exit angles at which incident rays exit from an entrance face in at least two directions or more. Additionally, a refractive prism section is provided at the image-watching side of the Fresnel lens sheet, in the range that includes a region present on a face opposite to a face of a region not having the totally reflective prism section. This refractive prism section refracts, by means of a second refraction phenomenon, the incident rays including the light totally reflected by the totally reflective prism section 10, and makes the incident rays go out as exit rays of a desired exit angle. In the present embodiment, a refractive face of the refractive prism section is made rougher than a totally reflective face of the totally reflective prism section 10.

If the totally reflective face of the totally reflective prism section is too rough, the incident angle of the rays partially becomes smaller than an angle of total reflection, causing part of the rays to go through without reflecting. In the present embodiment, therefore, the totally reflective face of the totally reflective prism section is processed into a mirror surface state to improve reflection efficiency of the totally reflective face by preventing the above event from occurring.

Conversely, if the refractive face of the refractive prism section assumes a state too close to a mirror surface state, multiple reflection occurs between the refractive face of the refractive prism section and a plane opposite thereto, thus causing a rainbow-colored conical ghost image to appear from the center of the Fresnel lens, toward a peripheral section thereof. In the present embodiment, therefore, in order to prevent this event from occurring, a metallic mold for manufacturing the Fresnel lens is surface-roughed using a sand-blasting method or the like, whereby the thus-molded Fresnel lens is roughed to reduce the multiple reflection. That is to say, in the present embodiment, the refractive face of the refractive prism section is made rougher than the totally reflective face of the totally reflective prism section 10. Therefore, the totally reflective face increases in reflectivity of light and decreases in diffusion ratio thereof, whereas the refractive face can have a lower light reflectivity and a stronger light diffusion ratio than the totally reflective face.

In the present embodiment, the totally reflective prism section 10 is formed into a shape constructed of at least two faces or more (or of a spherical or nonspherical face) to give, by generating a total-reflection phenomenon following completion of a first refraction phenomenon, exit angles at which the incident rays exit from the entrance face in at least two directions or more. The reason for such construction is described hereunder per FIG. 3.

Figure 3:
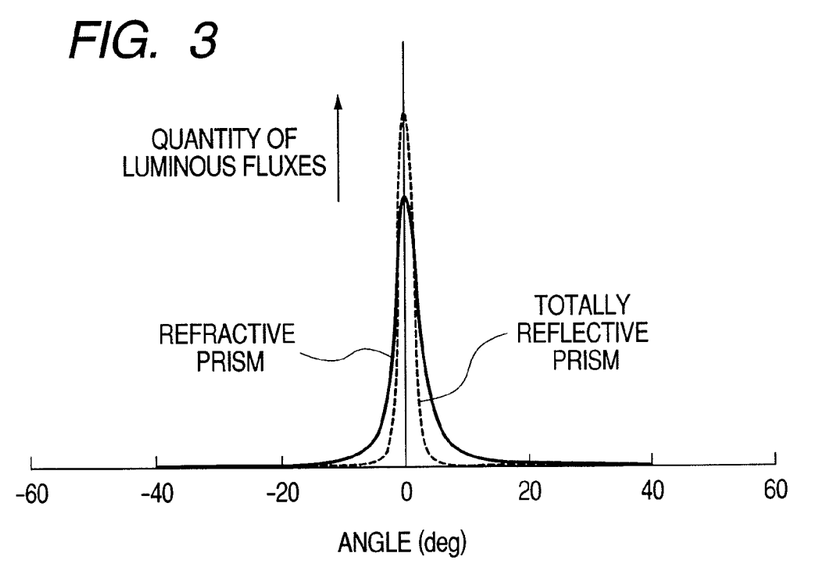
FIG. 3 is a diagram showing an amount-of-light distribution of the light which will exit when spot light is applied to a Fresnel lens sheet 6.

FIG. 3 is a diagram showing an amount-of-light distribution of the light which will exit when spot light is applied to the Fresnel lens sheet. In the figure, a divergence angle is plotted on a horizontal axis, and the quantity of luminous fluxes, on a vertical axis. When the totally reflective face of the totally reflective prism section is a plane, the light reflected by the totally reflective prism 10 and exiting in a direction approximately perpendicular to the Fresnel lens sheet 6 becomes highly directional light almost free from a flare, as depicted by a broken line in FIG. 3. Naturally, therefore, the amount of light also takes a large peak value. When the totally reflective face is in a mirror surface state, the exit light further augments in directionality. Conversely, since the refractive face of the refractive prism section is roughed, when the light refracted by the refractive prism section and exiting in the direction approximately perpendicular to the Fresnel lens sheet 6 passes through the refractive face, the light scatters and this causes a big flare as depicted by a solid line in FIG. 3. Naturally, therefore, the amount of light takes a small peak value.

The fact that as described above, the totally reflective prism section and refractive prism section of the same Fresnel lens sheet 6 differ in exit light pattern means that a change in image-watching position of a watching person causes nonuniformity of luminance between both prism sections. In order to prevent the nonuniformity of luminance from occurring, the totally reflective face of the totally reflective prism section 10 in the present embodiment is formed into a shape constructed of at least two faces or more (or of a spherical or nonspherical face) to give exit angles at which the incident rays exit from the entrance face in at least two directions or more.

Figure 4:
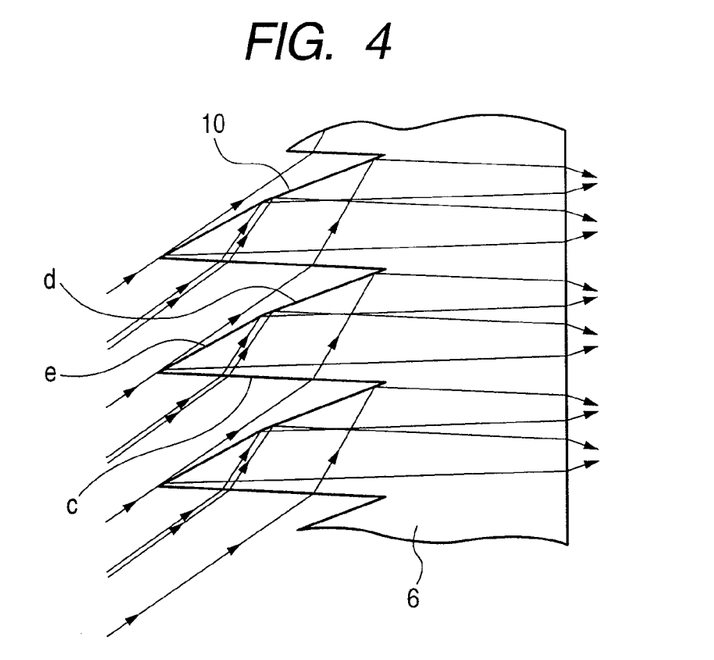
FIG. 4 is an enlarged sectional view of a totally reflective prism section 10, showing an embodiment of the Fresnel lens sheet 6 according to the present invention.
Figure 5:
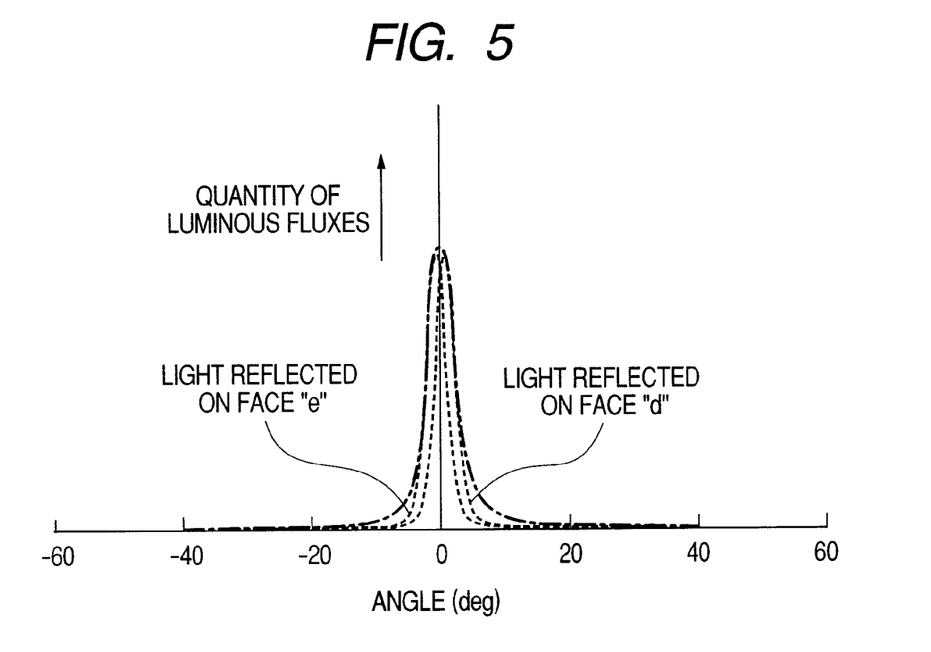
FIG. 5 is a diagram showing an amount-of-light distribution of the light which will exit when spot light is applied to the totally reflective section of the Fresnel lens sheet 6 according to the present invention.

FIG. 4 is a longitudinal sectional view of the totally reflective prism section (having such a shape as mentioned above) used in another embodiment of a Fresnel lens sheet 6 according to the present invention. This figure shows in an enlarged form the totally reflective prism section positioned near an upper left (right) end of a transmissive screen 3 in FIG. 3. The arrow shown in FIG. 4 indicates a direction of rays. As shown in FIG. 4, the totally reflective prism section 10 constructed of two faces is provided at the image source side of the Fresnel lens sheet 6, and a plane is formed at the image-watching side. Although, in FIG. 4, the prism section with two faces is shown for ease of description, this prism section may have three faces or a spherical or nonspherical face. Incident rays from the image source side enter from face "c" (entrance face) of the totally reflective prism section 10, and after being totally reflected on faces "d" and "e" (totally reflective faces), exit toward the image-watching side. At this time, light that has totally reflected on face "d" exits slightly downward with respect to the Fresnel lens sheet 6, whereas light that has totally reflected on face "e" exits slightly upward with respect to the Fresnel lens sheet 6. An exit pattern of the light rays at this time is shown in FIG. 5. As shown therein, the light that has totally reflected on face "d" deviates in a central direction of curvature of the Fresnel lens sheet (i.e., in a plus direction of angle in FIG. 5). Conversely, the light that has totally reflected on face "e" deviates in a direction opposite to the center of curvature of an outer Fresnel lens (i.e., in a minus direction of angle in FIG. 5). Synthesizing the two types of light forms such a pattern as denoted by a single-dashed line in FIG. 5, and this pattern is close to an exit pattern of the rays which exited from the refractive prism section of FIG. 3. Both patterns can even better be matched by forming the totally reflective face into a shape having three faces or more (or into a spherical or nonspherical shape), not two faces.

Figure 6:
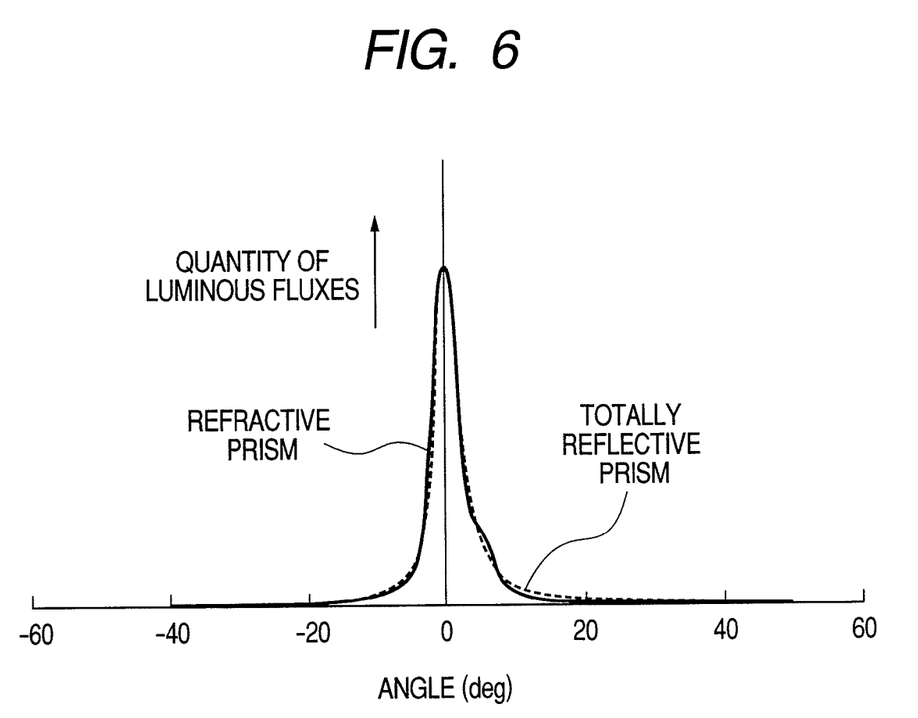
FIG. 6 is a diagram showing an amount-of-light distribution of the light which will exit when spot light is applied to the Fresnel lens sheet 6 according to the present invention.

Next, other embodiments of the present invention are described using FIGS. 6 and 7. FIG. 6 is a diagram showing an amount-of-light distribution of the light which will exit when spot light is applied to a Fresnel lens sheet. The light reflected by the totally reflective prism section and exiting in the direction approximately perpendicular to the Fresnel lens sheet 6 was handled as left/right symmetrically light in the description of FIGS. 3 and 5. An end portion of the totally reflective prism section, however, is prone to suffer a downward tilt due to the shape thereof during manufacture, and thus a big flare may occur in a central direction of curvature of the Fresnel lens sheet (i.e., in a plus direction of angle in FIG. 6), as denoted by a broken line in FIG. 6. In such a case, the need arises to form a refractive prism section 11 into a shape having at least two faces or more (or into a spherical or nonspherical shape) to give exit angles for light to exit in at least two directions or more.

Figure 7:
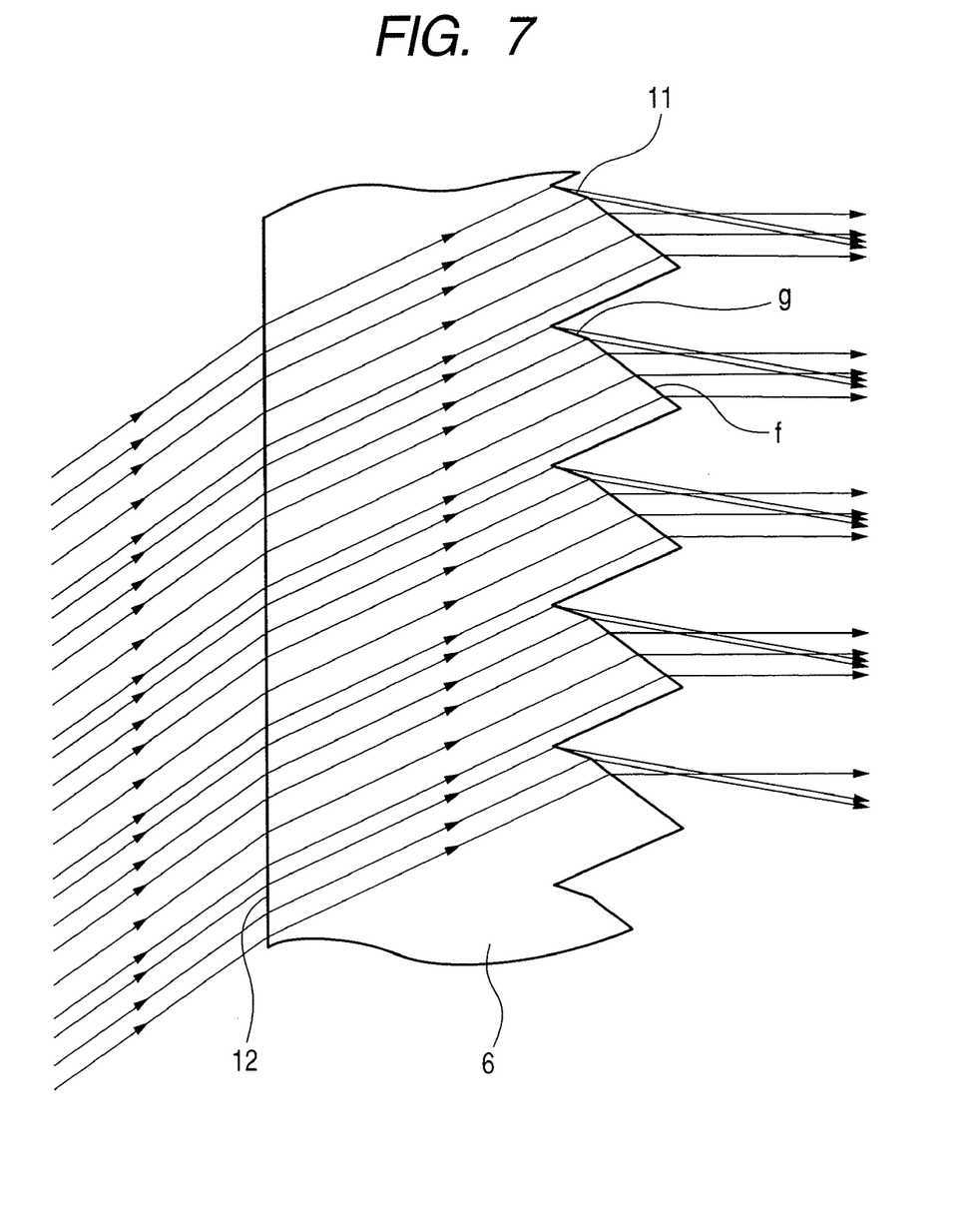
FIG. 7 is an enlarged sectional view of a refractive prism section 11, showing another embodiment of the Fresnel lens sheet 6 according to the present invention.

FIG. 7 is a longitudinal sectional view of a further embodiment of the Fresnel lens sheet 6 of FIG. 2 according to the present invention, showing in an enlarged form a section in which the totally reflective prism section shown in FIG. 4 is not provided. The arrow shown in FIG. 7 indicates a direction of rays. As shown in FIG. 7, a refractive prism section 11 constructed of two faces is provided at the image-watching side of the Fresnel lens sheet 6, and a plane 12 is formed at the image generation source side. Although, in FIG. 7, the prism section with two faces is shown for ease of description, this prism section may have three faces or a spherical or nonspherical face. Incident rays from the image source side undergo a third refraction phenomenon on the plane 12 and then exit from faces "f" and "g" (exit faces), toward the image-watching side while undergoing a second refraction phenomenon. At this time, light that has refracted on face "f" exits in a direction approximately perpendicular to the Fresnel lens sheet 6 (i.e., in a direction approximately parallel to an optical axis of the Fresnel lens), toward the image-watching side, whereas light that has refracted on face "g" exits in the central direction of curvature of the Fresnel lens sheet, toward the image-watching side. As denoted by a solid line in FIG. 6, a flare having a directionality in a central direction of curvature of the Fresnel lens sheet (i.e., in a plus direction of angle in FIG. 6) can thus be produced. For this reason, even if, at a totally reflective prism section 10, a big flare occurs in a central direction of curvature of the Fresnel lens, an image free from nonuniform luminance in whatever direction from the image-watching side can be produced. Both faces "f" and "g" of the refractive prism section 11 are formed into rough faces.

In the present embodiment, a prism configuration with at least faces or more (or a spherical face or a nonspherical face) for light to exit in two directions or more is employed for both the totally reflective prism section 10 provided at the image generation source side of the Fresnel lens sheet 6, and the refractive prism section 11 provided at the image-watching side. This configuration suppresses watching-angle-dependent changes in brightness due to the flare occurring in different directions. However, unless a left/right symmetrical flare occurs at the totally reflective prism section 10, such a prism configuration may not be adopted for the refractive prism section 11.

The present embodiment is adapted so that at an interface between the totally reflective prism section 10 and the refractive prism section 11, exit rays from the totally reflective prism section 10 pass through the refractive prism 11 having at least one pitch or more. In other words, the totally reflective prism section 10 and the refractive prism section 11 are arranged in such a manner that part (at least one pitch or more) of the totally reflective prism section 10 and part (at least one pitch or more) of the refractive prism section 11 overlap on each other in a direction orthogonal to a principal plane of the Fresnel lens sheet 6. The reason for the arrangement is described below using FIG. 8.

Figure 8:
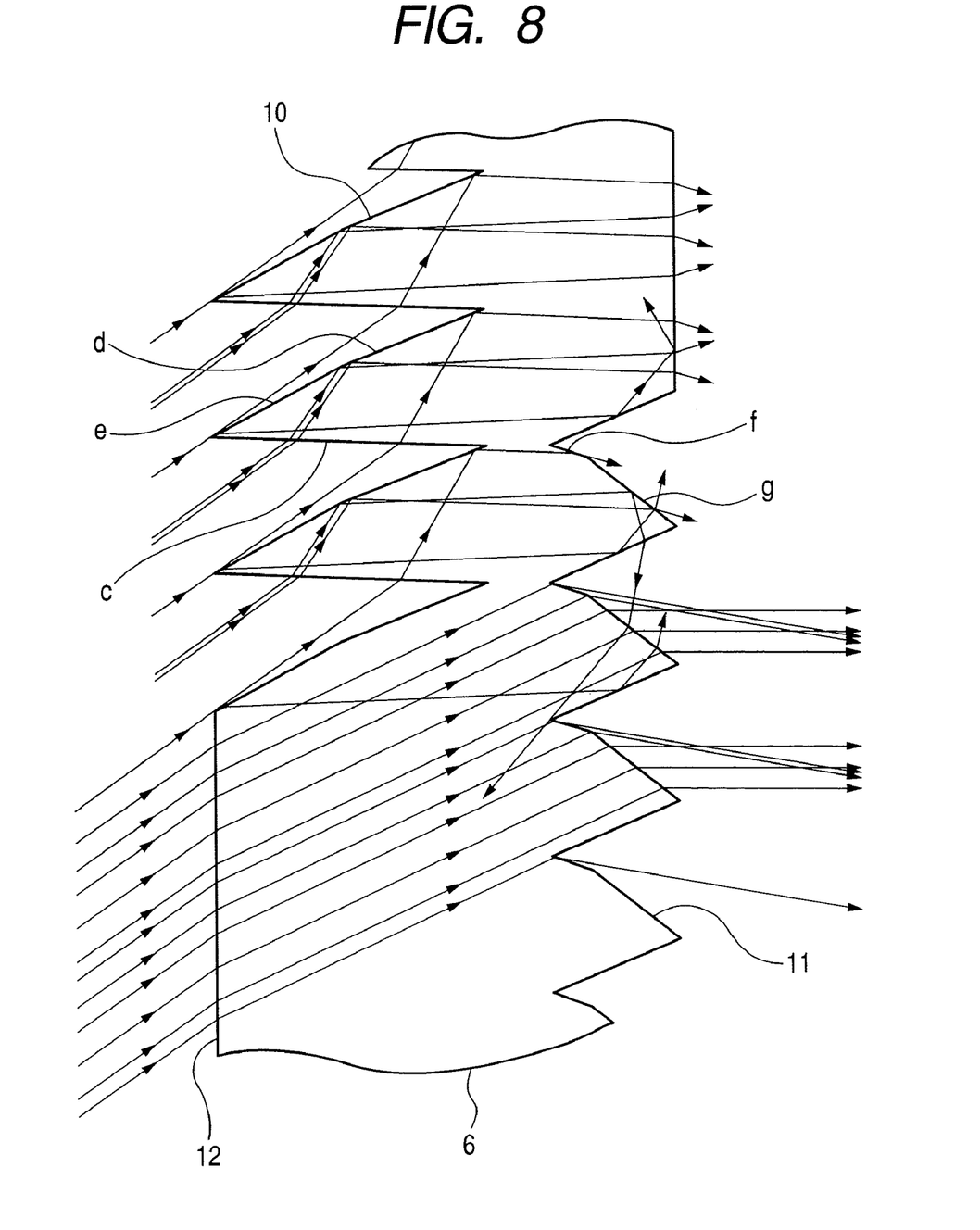
FIG. 8 is an enlarged sectional view of an interface between a totally reflective prism section 10 and a refractive prism section 11, showing yet another embodiment of the Fresnel lens sheet 6 according to the present invention.

FIG. 8 is a longitudinal sectional view of a further embodiment of a Fresnel lens sheet 6 according to the present embodiment. The figure shows in an enlarged form an interface between a totally reflective prism section 10 and a refractive prism section 11, in which case the interface is provided at the image source side. As shown in FIG. 8, a required region at the image source side of the Fresnel lens sheet 6 is a flat section (planar section) 12 at which the totally reflective prism section 10 is not provided. The reason for that is that the totally reflective prism section 10 cannot be provided if an incident angle of the image projected from the foregoing optics at the image generation source side, with respect to the Fresnel lens sheet 6, is too small. Therefore, in a range of small incident angles of the projected image with respect to the Fresnel lens sheet 6, a flat section and the refractive prism section 11 are to be provided at the image source side and the image-watching side, respectively, as a normal exit-face Fresnel lens configuration. In the Fresnel lens sheet 6 of the present embodiment, therefore, the image source side suddenly changes in shape from the flat section to the section at which the totally reflective prism section 10 is provided. Since the image source side and image-watching side of the Fresnel lens sheet 6 are molded in different metallic molds, expansion and contraction due to temperature differences make it difficult to match both faces completely in terms of position. The appropriate preventive measure is therefore required that even when the image source side changes from the flat section to the section at which the totally reflective prism section 10 is provided, the change will not appear on the image.

For the Fresnel lens sheet 6 of FIG. 8 according to the present embodiment, the interface is adapted such that the rays that have exited the totally reflective prism section pass through the refractive prism 11 of at least one pitch or more. In other words, part of the totally reflective prism section 10 and part of the refractive prism section 11 overlap on each other in a direction orthogonal to a principal plane of the Fresnel lens sheet 6. Light that has entered from face "c" of the totally reflective prism section 10 and totally reflected on faces "d" and "e" will exit intact if the image-watching side of the Fresnel lens sheet 6 is flat. When the particular light enters the refractive prism section 11, however, the light totally reflects thereat as shown, and exits upward or downward. This makes the light not clearly visible from the image-watching side. Since these rays of image light are not clearly visible from the image-watching side, the image slightly becomes missing. Even so, the image defect disappears that deviation between the image source side and image-watching side of the Fresnel lens sheet 6 results in the image light being lost and thus in a black arc appearing. In addition, even when the image is missing, the missing portion cannot be conspicuously large since its amount is only as small as the amount of deviation between both faces and since manufacturing accuracy of the Fresnel lens sheet 6 is originally high.

Figure 9:
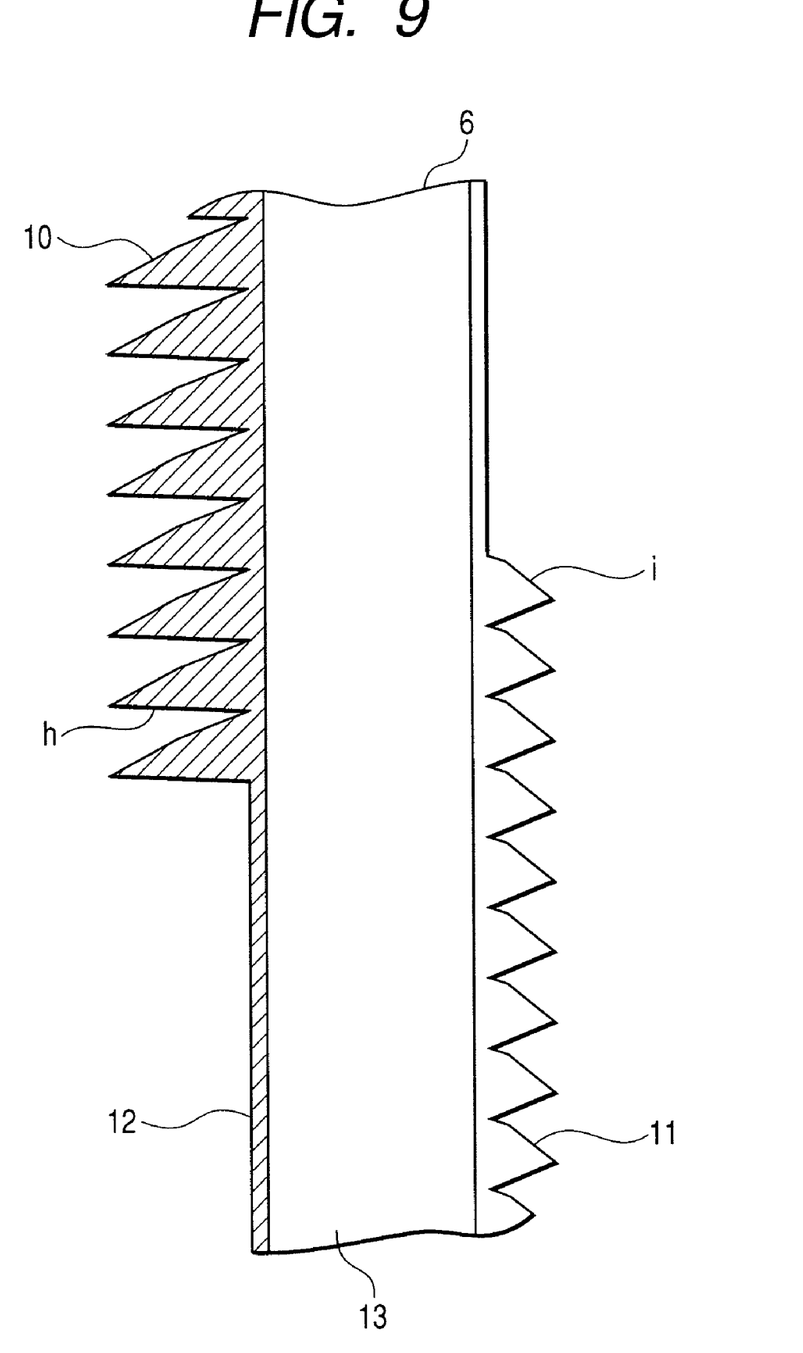
FIG. 9 is a view showing a further embodiment of the Fresnel lens sheet 6 according to the present invention.
Figure 10:
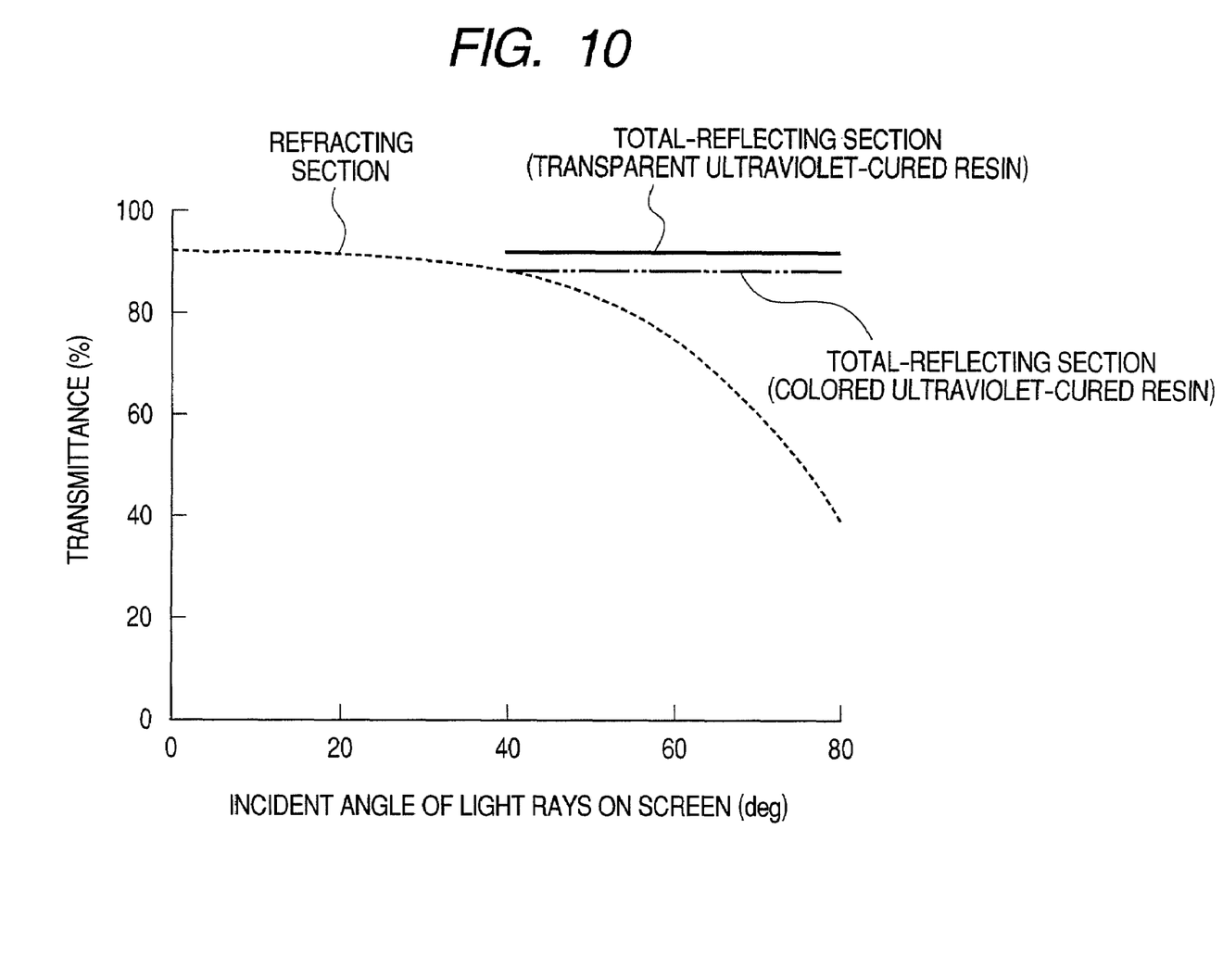
FIG. 10 is a diagram showing the light-ray incident angle characteristics of the refractive section and totally reflective section against the transmittances thereof.

In general, ultraviolet-cured-type resin is used to mold the totally reflective and refractive prism sections of Fresnel lens sheets. FIG. 9 is a longitudinal sectional view of a further embodiment of a Fresnel lens sheet 6 according to the present invention, wherein the Fresnel lens sheet 6 has totally reflective and refractive prism sections molded using ultraviolet-cured resin. On a transparent base material 13 constituting the Fresnel lens sheet 6, a totally reflective prism 10 and a refractive prism 11 are formed using ultraviolet-cured resin. In the present embodiment, a first ultraviolet-cured resin layer that forms the totally reflective prism 10 is set to have a transmittance lower than that of a second ultraviolet-cured resin layer which forms the refractive prism 11. Such setting is possible by, for example, coloring the first ultraviolet-cured resin layer. The reason why a difference in transmittance is provided between the first and second ultraviolet-cured resin layers is set forth below using FIG. 10. FIG. 10 is a diagram that shows incident angle characteristics of totally reflective/refractive prism with a vertical axis taken for the transmittance of the prism section and a horizontal axis taken for an incident angle of rays on the screen. As is obvious from FIG. 10, the transmittance of the refractive prism section 11 (refractive section) abruptly decreases when the incident angle of rays on the screen increases above about 40 degrees. Contrary to this, the transmittance of the totally reflective prism section 10 (totally reflective section) is approximately abruptly constant, regardless of the incident angle of rays on the screen. Additionally, the totally reflective section cannot be constructed if the incident angle of rays on the screen is less than 40 degrees. Hence, when the transmittance of the first ultraviolet-cured resin layer (totally reflective prism section 10) and the transmittance of the second ultraviolet-cured resin layer (refractive prism section 11) are equal, even if the interface between both prism sections is formed at whatever position on the screen (at an arbitrary position where the angle of incidence on the screen is equal to or greater than 40 degrees), nonuniform luminance occurs between exit light of the totally reflective prism section 10 and exit light of the refractive prism section 11. The present embodiment, therefore, reduces or completely prevents the occurrence of the above-mentioned nonuniform luminance by coloring the first ultraviolet-cured resin layer for reduced transmittance thereof (as denoted by a double-dashed line in FIG. 10) and matching the transmittances of the first and second ultraviolet-cured resin layers at the above interface, to each other.

Figure 11:
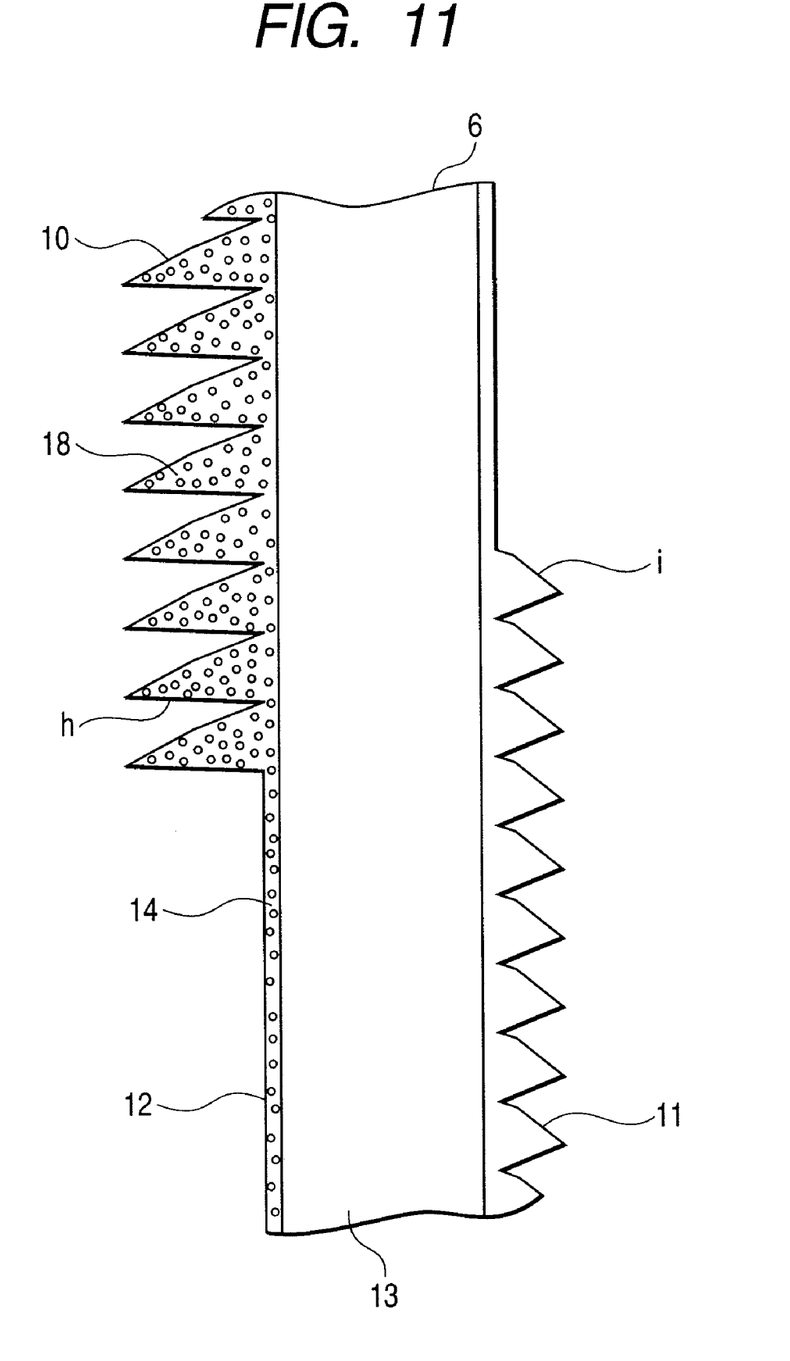
FIG. 11 is a view showing a further embodiment of the Fresnel lens sheet 6 according to the present invention.
Figure 12:
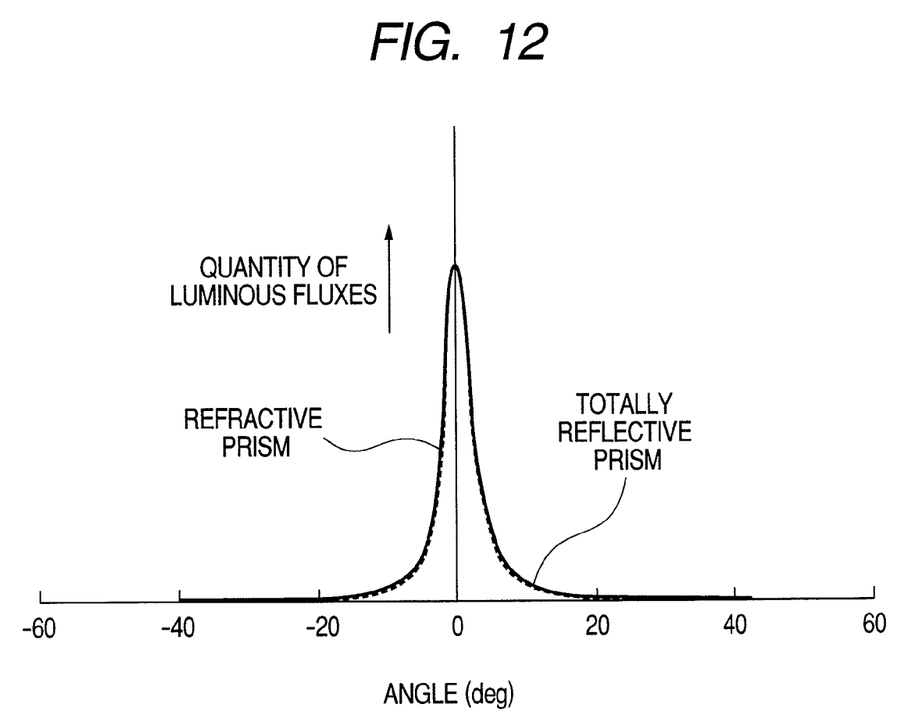
FIG. 12 is a diagram showing an amount-of-light distribution of the light which will exit when spot light is applied to the Fresnel lens sheet 6 shown in FIG. 11.

FIG. 11 is a longitudinal sectional view showing a further embodiment of a Fresnel lens sheet 6 according to the present invention, wherein the Fresnel lens sheet is molded using an ultraviolet-cured-resin. The same reference numbers as in FIG. 9 denote the same components. FIG. 11 differs from FIG. 9 in that a diffusing material 18 is contained in a totally reflective prism 10. Since the diffusing material 18 is mixed with ultraviolet-cured resin, the diffusing material also enters a first ultraviolet-cured resin layer 14 on which the totally reflective prism 10 is not formed. The entry, however, does not cause too significant effects since the first resin layer 14 is thin and since rays pass therethrough vertically. When the diffusing material 18 is contained in the totally reflective prism 10, this improves an amount-of-light distribution of the light which will exit when spot light is applied to the totally reflective prism section of the Fresnel lens sheet 6. FIG. 12 is a diagram showing an amount-of-light distribution of the light which will exit when spot light is applied to the Fresnel lens sheet 6 of FIG. 11. An amount-of-light distribution of the light exiting from the totally reflective prism section 10, and an amount-of-light distribution of the light exiting from the refractive prism section 11 can even better be matched by constructing a reflective face of the totally reflective prism 10 into a twin-face shape and including the diffusing material 18 in the totally reflective prism 10. However, since including the diffusing material 18 lowers a peak value of the quantity of light fluxes, there is a need to reduce the quantity of coloring of the ultraviolet-cured resin used to form the totally reflective prism 10.

While both the totally reflective prism and refractive prism in each of the above embodiments are sharp at respective ends, these ends of the totally reflective prism and refractive prism may be rounded (i.e., curved) for the sake of convenience in molding, and to prevent discontinuous portions of light from occurring.

What is claimed is:

1. An image display apparatus comprising:
    an image generation source;
    optics for projecting in an enlarged form an image generated by said image generation source; and
        a transmissive screen for displaying the image projected from said optics:
    wherein said transmissive screen includes at least both a Fresnel lens sheet disposed at an image generation source side, and a diffusing sheet disposed at an image-watching side, the diffusing sheet diffusing image light in at least a horizontal direction of said screen;
    the Fresnel lens sheet includes both a totally reflective prism formed at the image generation source side, and a refractive prism formed at the image-watching side, the totally reflective prism not only being formed in a region where the light enters at an angle equal to or greater than a desired incident angle, at the image generation source side of the Fresnel lens sheet, but also including both an entrance face from which the light enters, and a totally reflective face that reflects the incident light entering from the entrance face and makes the light exit toward the image-watching side; and
    the totally reflective face is constructed of more than at least two faces, or as a spherical face or a nonspherical face, for causing the incident light from the entrance face to go out as exit rays of exit angles with more than at least two directions.

2. The image display apparatus according to claim 1, wherein the region where said refractive prism is provided is such a region that causes the rays exiting from said totally reflective prism to overlap more than at least one pitch of said refractive prism.

3. The image display apparatus according to claim 1, wherein;
    on a transparent base material constituting said Fresnel lens sheet, said totally reflective prism and said refractive prism are formed using ultraviolet-cured resin; and
    a transmittance of a first ultraviolet-cured resin layer for forming said totally reflective prism is lower than a transmittance of a second ultraviolet-cured resin layer for forming said refractive prism.

4. The image display apparatus according to claim 1, wherein: on a transparent base material constituting said Fresnel lens sheet, said totally reflective prism and said refractive prism are formed using ultraviolet-cured resin; and a diffusing material is contained in the ultraviolet-cured resin used to form said refractive prism, and/or in the ultraviolet-cured resin used to form said totally reflective prism.

* * * * *